United States Patent [19]
Paul et al.

[11] Patent Number: 5,231,627
[45] Date of Patent: Jul. 27, 1993

[54] APPARATUS FOR READING OPTICALLY ENCODED SOUNDTRACKS

[75] Inventors: Michael W. Paul, Rockwood; Sydney T. Wiles, Mississauga, both of Canada

[73] Assignee: National Film Board of Canada, St. Laurent, Canada

[21] Appl. No.: 757,404

[22] Filed: Sep. 10, 1991

[51] Int. Cl.$^5$ .................................................. G11B 7/00
[52] U.S. Cl. ..................................... 369/125; 369/124; 369/120
[58] Field of Search ............... 369/125, 124, 118, 112, 369/44.41, 120

[56] References Cited
U.S. PATENT DOCUMENTS

| | | | |
|---|---|---|---|
| 4,085,296 | 4/1978 | Keegan | 369/112 |
| 4,124,784 | 11/1978 | Johnson et al. | 369/124 |
| 4,355,383 | 10/1982 | Dolby | 369/124 |
| 4,698,787 | 10/1987 | Mukherjee et al. | 365/900 |

Primary Examiner—Jack I. Berman
Attorney, Agent, or Firm—Bereskin & Parr

[57] ABSTRACT

An apparatus for reading variable area optically encoded soundtracks has a light source, a lens system and a detector. The detector can be a linear array, for example a CCD array, with an integral slit, with the lens system imaging the soundtrack in the plane of the slit. The apparatus includes circuitry for processing the detector output signal. The processing circuitry can be provided with a feedback control circuit to condition the detector output signal so that the resulting audio signal is not affected by variations in the film or electronic components. Further, a circuit can be included for detecting whether an analogue or digital soundtrack is present, and automatically switching the output of an amplification circuit between analogue and digital outputs.

41 Claims, 9 Drawing Sheets

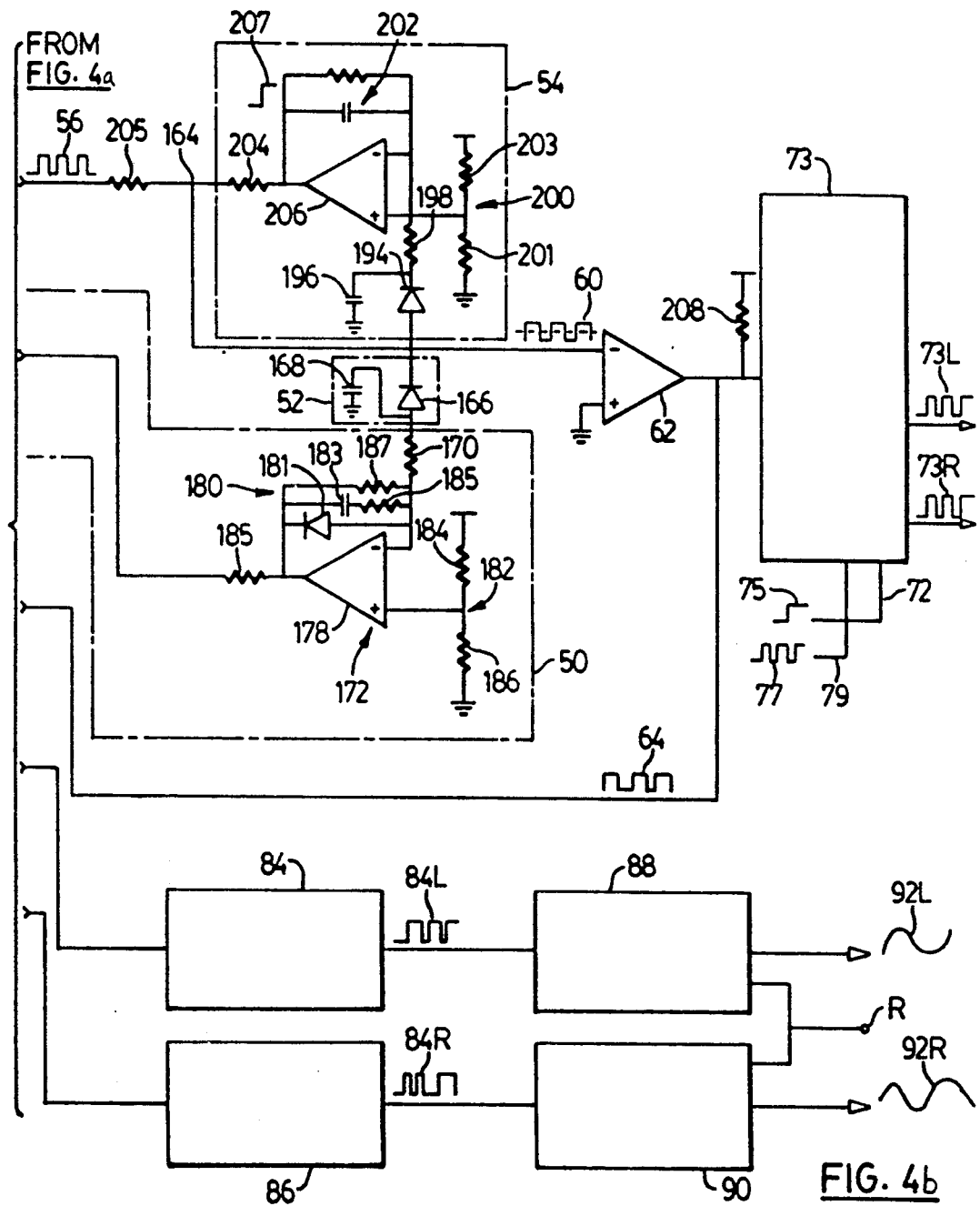

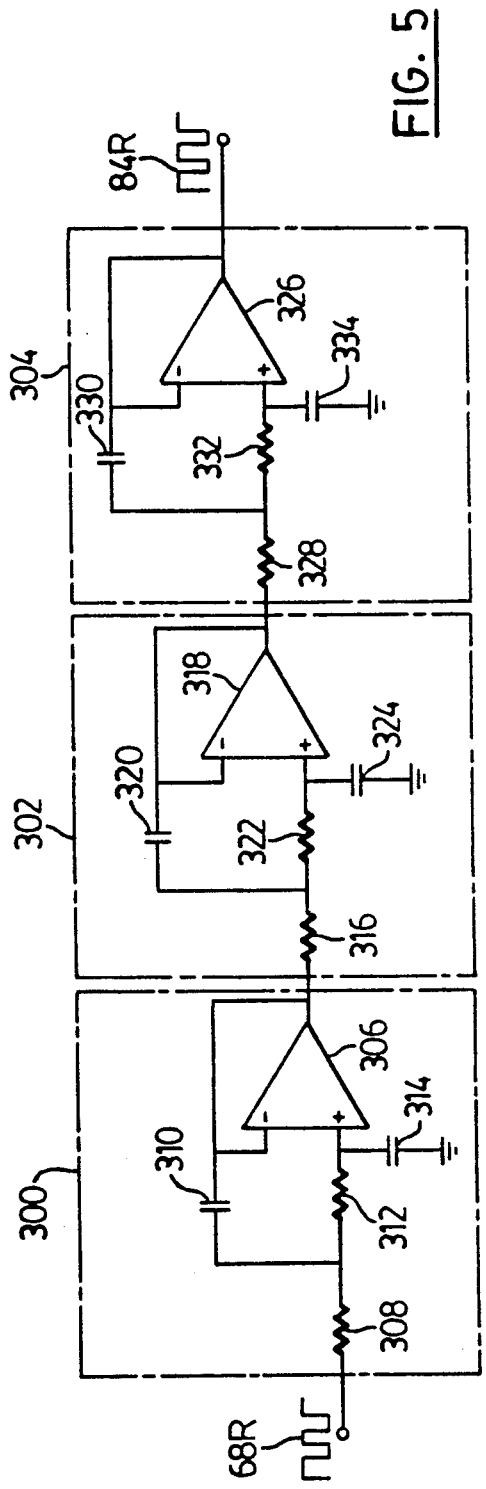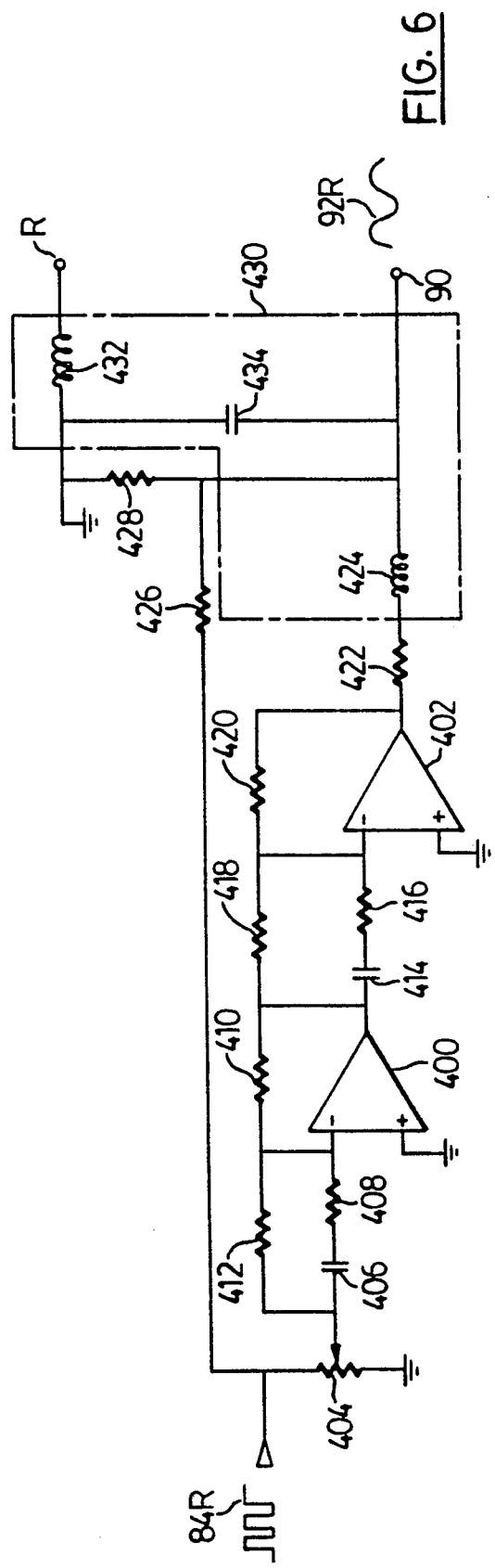

APPARATUS FOR READING OPTICALLY ENCODED SOUNDTRACKS

FIELD OF THE INVENTION

This invention relates to an apparatus for reading optically recorded soundtracks or signals, more particularly variable area optical tracks as incorporated in motion picture films.

BACKGROUND OF THE INVENTION

Sound motion pictures have historically employed a variety of types of soundtracks, including variable density optical tracks and magnetically-recorded tracks.

The present invention is concerned with a third type, namely variable area optical tracks. Such soundtracks are currently recorded in accordance with accepted industry standards.

At the present time, the motion picture industry uses analogue soundtrack with such a variable area density strip, carried alongside the film image. To read such a track, present practice requires an incandescent exciter lamp as a source, a small projection lens system and a slit to image the exciter lamp on to the analogue area of the film soundtrack. The received radiation passing through the film soundtrack is picked up by a photosensitive detector and amplified, with the amplified signal being connected to appropriate loud speakers, etc. Thus, the detected signal becomes the soundtrack.

A major disadvantage and difficulty with this system is that the exciter lamps have to be changed frequently on each film projector. This is a skilled and labor intensive operation, because the lamp current and the physical position of the lamp filament need to be adjusted each time a lamp is changed, in order to maintain sound quality. After changing a lamp a test soundtrack, known in the industry as Buzz Track, is run. As there is no zero base line on variable area soundtrack, the use of an automatic gain control system (AGC) is precluded. This would have been an obvious way to correct for lamp and detector aging.

This known prior art system suffers from a number of disadvantages. It requires a lot of maintenance and scrupulous cleanliness, whilst providing less than optimal signal - to - noise ratio. Further, in general, such a system requires a high degree of shielding from extraneous ambient light, lest such light degrade the output signal.

Proposals have been made for alternative soundtrack reading systems. U.S. Pat. No. 4,085,296 (Keegan) discloses a modulated sound reading system. Here, a light emitting diode is the excitation source. It is modulated at a carrier frequency several times higher than the highest frequency component of the soundtrack. The light beam transmitted through the soundtrack is detected by a photo-sensing device in an analogue format. The output signal of the photo-sensing device is demodulated and fed into a signal processing circuit to draw out the audio signal.

This proposal suffers from a number of disadvantages. First, it requires an elongate slit adjacent the LEDs, and hence has all the problems of aligning various optical components to ensure that they are properly aligned. Further, in this arrangement, the detector is a phototransistor or solar cell, which would not be suitable for reading a digital soundtrack. It simply senses the overall intensity of the light passing through the soundtrack.

U.S. Pat. No. 4,124,784 (Johnson et al) discloses a motion picture sound system. Here, a light source, e.g. a conventional filament lamp, and an aspheric lens are provided for illuminating the soundtrack. This arrangement is intended to produce a narrow band or strip of light that illuminates a corresponding narrow band of the soundtrack. On the other side of the film strip, there is a focusing lens and a detector having an array, preferably a linear array, of photosensors. The problem with this arrangement is that it requires careful alignment and adjustment of the various components. The narrow strip of light focused onto the soundtrack must be well focused; if it is blurred, then this will result in degradation of the reproduced soundtrack. For good reproduction of the soundtrack, it is essential to focus the hot spot of the lamp filament, as present in the narrow band of light, onto the detector array. This is difficult to achieve consistently. Maladjustment of the focus of the slit image on the soundtrack will result in loss of high frequency components from the material.

A further potential problem, which becomes important as the width of the slit is decreased in an attempt to provide high frequency response, is the production of Fresnel fringes in the image of the slit on the soundtrack. When the detector "sees" these fringes, a further loss of audio high frequency content will occur. By using an incandescent exciter lamp, the effect of the Fresnel fringes is reduced, because the classical light and dark bands associated with these fringes developed by monochromatic light are replaced by alternating colored bands of light. As the typical detector used responds nearly equally to different colors, the effect is merely to broaden the image of the slit, again resulting in sound degradation.

Another problem associated with the current state of the art detectors in film theater operation is that the light output of an incandescent lamp changes, with changes in the electrical current flowing through its filament. With time, the filament material is evaporated and deposited on the inside of the glass envelope. Light transmission losses between the lamp and the light detector varies with the dirt contamination on optical surfaces. As these surfaces are close to the film threading path, such contamination is inevitable. As mentioned, automatic gain control is not possible, and for current lamp technology, the sound reproduction system is provided with an adjustable variable current power supply. The only way to compensate for these normal variations is to adjust manually the exciter lamp current. This is known the art as an open loop control system and requires operator intervention.

This alignment of the optical path and changing light intensity of the light detector are sources of major service items in theater operation.

In U.S. Pat. No. 4,698,787 there is disclosed an optical type information reproducing device. This particularly concerned with reproducing information from a laser disc, and as such is concerned with a somewhat different area of sound recording. It includes a so-called laser pick up device comprising a plurality of signal reproducing PIN diodes.

SUMMARY OF THE PRESENT INVENTION

In accordance with a first aspect of the present invention, there is provided an apparatus, for reading an audio signal track, incorporated as an optically encoded variable area track on a tape, said apparatus comprising: a light source for illuminating a soundtrack on the tape from one side thereof; a linear detector array, for location on the other side of the soundtrack and including an integral slit which determines a transverse strip of the image of the soundtrack that is read; and said linear detector array including means for producing an encoded signal in response to the image of the soundtrack.

In accordance with a second aspect of the present invention, there is provided an apparatus, for reading a variable area soundtrack, incorporated as an optically encoded variable area track, on a tape, said apparatus comprising: a light source for illuminating one side of the soundtrack; detector means for location on the other side of the soundtrack; said detector means including integral slit means for causing a narrow, transverse strip of the soundtrack to be detected by said detector means, and said detector means producing an encoded signal indicative of the detected transverse strip of the soundtrack; processing means, coupled to said detector means, for processing said encoded signal into an output audio signal; and said processing means including feedback control means for conditioning said encoded signal so that said output audio signal is substantially uniform and independent of the characteristics of said variable area soundtrack.

In accordance with a third aspect of the present invention, there is provided an apparatus for reading a variable area soundtrack, incorporated as an optically encoded variable area track, on a tape, said apparatus comprising: a light source for illuminating one side of the soundtrack; detector means for location on the other side of the soundtrack, and having a encoded signal output; processing means connected to said encoded signal output of the detector, and said processing means having a processed signal output; a digital-analogue control unit connected to the output of said processing means and having an analogue input, a digital input, a control input, and an audio signal output; and control means for detecting whether an analogue or digital soundtrack is present and generating a decode control output, said control means being connected to said control input of said digital-analogue control unit.

BRIEF DESCRIPTION OF THE DRAWING FIGURES

For a better understanding of the present invention, and to show more clearly how it may be carried into effect, reference will now be made, by way of example, to the accompanying drawings in which:

FIG. 1 is a perspective view depicting an apparatus according to the present invention;

FIG. 2. is a schematic block diagram of the electronic circuit of the apparatus according to the present invention;

FIGS. 4a and 4b are a schematic diagram of the electronic circuit of FIG. 2;

FIG. 5 is an electronic schematic diagram of the sixth-order bandpass filter incorporated in the electronic circuit of the present invention;

FIG. 6 is an electronic schematic diagram of the emphasis filter included in the electronic circuit of the present invention;

FIG. 7b is an electronic schematic diagram of the digital/analogue decode control circuit of FIG. 7a.

DESCRIPTION OF THE PREFERRED EMBODIMENT

Figure 1:
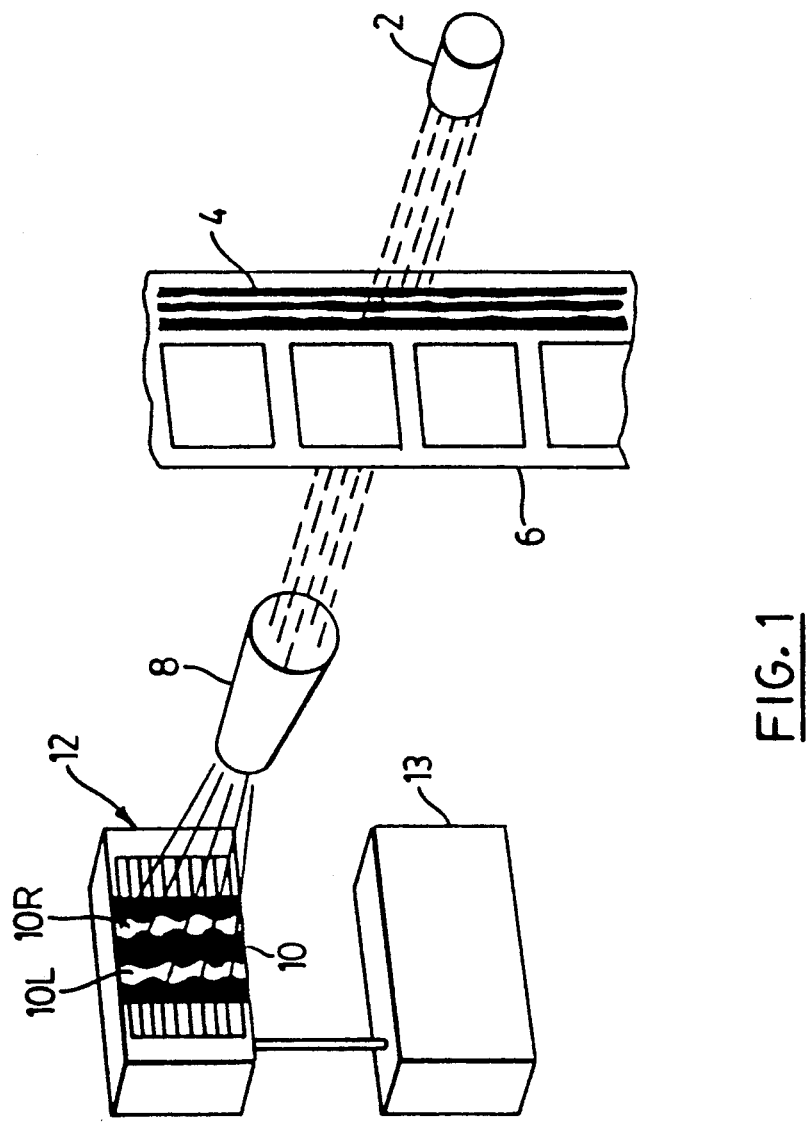

Referring first to FIG. 1, an apparatus according to the present invention has a light source 2, which is a solid state light emitting diode (LED). The light source 2 is arranged to illuminate a soundtrack strip 4 which is formed on a motion picture film indicated by 6.

Optionally, the light source 2 could be equipped with a lens 8 to focus or concentrate the emitted light on a small area of the soundtrack strip 4. However, as will be discussed below, the lens 8 plays no part in generating an optical slit or narrow sample of light. As shown in FIG. 1, the lens 8 is positioned on the other side of the film 6 with respect to the light source 2. In this position, the lens 8 concentrates the image of the soundtrack 4 into a focused image 10 which is in the same plane as a photodetector array shown at 12.

The photodetector array 12, shown in FIG. 1, converts the light energy of the focused image 10 into an electrical signal. This electrical signal, in turn, is further processed by a signal processor 13 to recover the encoded sound information as will be discussed in detail below. For optimum performance, the photodetector 12 has to process the light energy at a high speed. As is known to one skilled in the art, charge coupled device (CCD) image sensors provide very high output data rates by integrating a photodetector array with CCD shift registers. A suitable photodetector array 12 based on CCD technology is the IL-C4 linear image sensor array manufactured by Dalsa Inc. To provide high speed data throughput the sensor array includes a dual output structure. The dual output structure comprises a CCD register for even pixels and a CCD register for odd pixels.

In the preferred embodiment, the photodetector array 12 has a linear array of 1,024 photodiode elements (not shown). The linear array of photodiodes is 14 micro-meters wide and in total provides a photosensitive area of 196 square micro-meters per diode. The arrangement of photodiode elements as a linear array, in effect, provides an integral slit. As the slit is integral with the linear arrangement of the photodiode elements, and more particularly as it is not displaced in the direction of light flow away from the photodiode elements, then it is impossible to experience any misalignment or development of Fresnel fringes. As the arrangement prevents the occurrence of Fresnel fringes, it is possible to use a more efficient and effective monochromatic light source 2. In this respect, the spectral energy available from a LED as the light source 2 is a better match to the spectral sensitivity of a photodiode element in the CCD photodetector 12, than is an incandescent lamp. As can be appreciated by one skilled in the art, the operating life of a solid state light source is also much longer than that of an incandescent lamp.

As mentioned, the photodetector 12 is a charge coupled device, i.e. the device incorporates CCD shift registers to maximize data (i.e. converted light energy derived from the focused image 10) output speed and reduced noise. The photodiode elements (not shown) of the photodetector array 12 provide a linear response with respect to the input light intensity. The output of the photodetector 12 varies between one level, known as the dark level when no light falls on the photodiode elements, and another level, known as the light reference level where maximum light falls on the associated photodiode element.

The CCD output structure (not shown) of the photodetector array 12 requires reset pulses. The reset pulses arise from the necessity of resetting the current charge state (i.e. the converted light energy) on the CCD output structure immediately prior to inputting the next charge packet in the reading sequence. To provide high quality sound reproduction, the photodetector array 12 must be operated as rapidly as possible. In other words, the electronic signals generated from the converted light energy must be read from the output structure of the photodetector 12 as quickly as possible because the light energy forms a continuous stream of data which is shifted through the photodetector array 12 and its output structure. For example, when reading digital sound code, the CCD output structure of the photodetector array 12 is clocked at close to 27 mega bits/second, for each of the odd and even pixel registers. By interweaving the odd and even pixel streams, i.e. using a summation logic block, an information rate that is twice as large is obtained. When reading an analogue soundtrack, the same high reading rate is required to keep the Nyquist sampling frequency at twice the highest frequency component in the soundtrack signal. By using a photodetector array 12 with dual outputs, the data read-out times can be maximized.

It should be appreciated that the lens 8 effectively magnifies the image 10 of the soundtrack 4. Put another way, as seen by the soundtrack 4, the slit integral with the photodetector 12 is demagnified. Thus, while the photodetector array 12 can provide a 14 micron wide slit, this is effectively demagnified to a slit of 0.00020 inches, or less than 5 microns.

Figure 2:
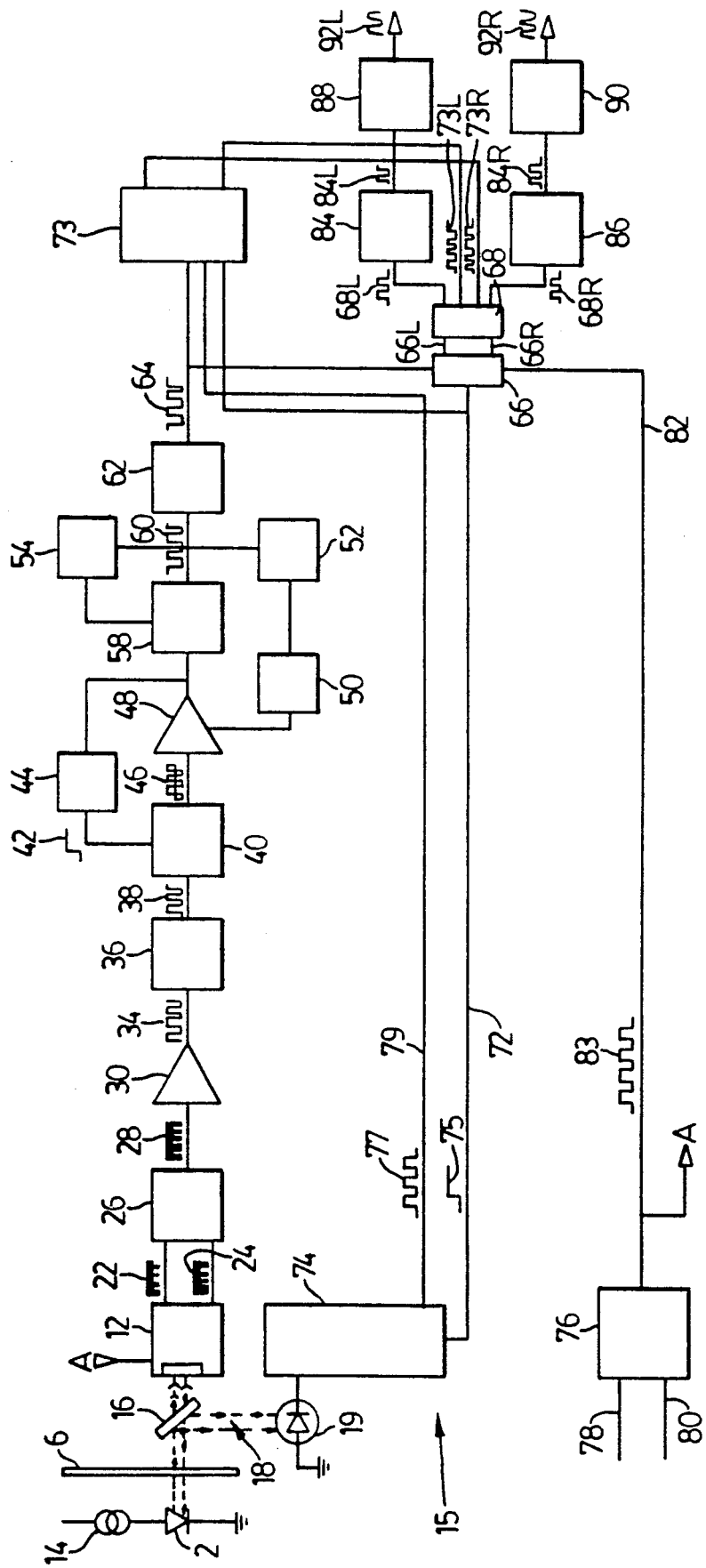

Referring now to FIG. 2, the light source 2, the film 6, the photodetector array 12, and the signal processor 13 are shown schematically. The circuit associated with the signal processor 13 for the apparatus according to the present invention is denoted by 15. Additionally, there is shown a current source 14 for the LED light source 2, and a beam splitter 16. The current source 14 supplies the current drive for the light source 2. The beam splitter 16 splits off part of the beam produced by the light source 2, as indicated at 18. The split beam 18 is directed to a PIN diode 20 for purposes detailed below.

Figure 3A:
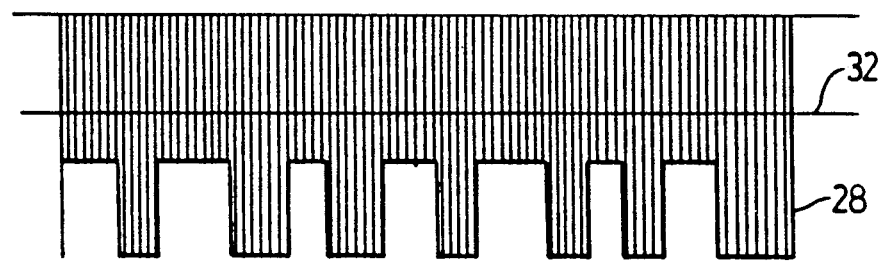
FIGS. 3a, 3b and 3c are profiles of a signal waveform at various processing stages in the electronic circuit of FIG. 2.

As mentioned above, the output structure of the photodetector array 12 has two outputs, one for an odd pixel data stream 22 and another for an even pixel data stream 24. The two pixel streams 22, 24 are clocked from the outputs into a summation unit 26. The summation unit 26 sums the odd pixel stream 22 and the even pixel stream 24 into a single output signal 28. At this point, the output signal 28, in radio terminology, is effectively a demodulated carrier wave, as shown in FIG. 3a.

Referring back to FIG. 2, the output signal 28 then passes through an AC coupled amplifier 30. The AC amplifier 30 has an average zero base line 32 as shown in FIG. 3a. As is known to one skilled in the art, the base line is the constant value output by the amplifier 30 when there is no input signal.

The AC amplifier 30 produces an adjusted demodulated carrier signal 34 which feeds into the next stage which is a five stage Chebyshev filter 36. The Chebyshev filter 36 attenuates high-end frequency information on the carrier signal 34. It is necessary to attenuate the carrier signal 34 because for digitally encoded soundtrack information, the pixel or carrier frequency of the signal may be approximately eleven times higher than the highest frequency of the modulated sound information. In the present invention, the demodulated carrier signal 34 has a frequency of 27 MHz, whereas the modulated sound information 10 is encoded using small amplitude pulse width modulation at a frequency of 52.7 KHz. Accordingly, the present invention includes the high order (fifth order) low pass filter 36 to reduce the frequency information at 27 MHz and higher. The invention utilizes a high order filter to give a large attenuation of the demodulated carrier signal 34, in the order of −40 to −60 decibels (DB), and signal ripple in the pass band at −3 DB at 2 to 5 MHz.

The filter 36 produces an attenuated carrier signal 38 which next feeds into a second summation unit 40. The summation unit 40 sums the attenuated carrier signal 38 and a zero base line control feedback signal 42. The base line control feedback signal 42 stabilizes the average base line to zero. The control feedback signal 42 is generated by a zero base line control unit 44. The base line control unit 44 has a zero volt DC reference, which will be discussed in detail. The base line control unit 44 helps stabilize the circuit 15 against thermal, aging and component tolerances.

The summation unit 40 produces a summed output signal 46 which feeds into a AC coupled amplifier 48. To keep the signal-to-noise ratio (S/N) at an optimum level, the amplifier 48 has a variable gain control unit 50. As will be discussed in greater detail below, the gain control unit 50 varies the gain of the amplifier 48 to maximize the signal-to-noise ratio of the signal 46.

The gain control unit 50 works in conjunction with a negative peak detector circuit 52 and a positive peak detector circuit 54. The peak detectors 52, 54 are necessary to condition the signal 46 which at this point comprises a varying width rectangular waveform. The signal 46 may have positive portions which are less than, equal to or greater than the negative portions. As discussed above, the various stages of the circuit 15 are AC coupled, and because of the AC coupling, pulse width modulation of the signal 46 will also cause an undesirable amplitude modulation. To maintain constant amplitude in both the negative and positive excursions of the signal 46, the circuit 15 according to the present invention includes the positive peak detector circuit 52 and the negative peak detector circuit 54.

The positive peak detector 54 is fed by the output of the amplifier 48. As shown in FIG. 2, the output of the amplifier 48 is first fed into a third summation unit 58. The output of the summation unit 58 then feeds into the positive peak detector 54. The peak detector 54 controls the amplitude of the positive pulses in the signal 46 to a level of +1 volt. The positive portion of the signal 46 represents the condition of no light, or in other words, opaque portions of the variable area soundtrack 4 on the film 6. In conjunction with the summation unit 58, the appropriate voltage is added to the signal 46 to bring it up to +1 volt.

As shown in FIG. 2, the negative peak detector 52 is also fed by the summation unit 58. The negative peak detector 52 controls the amplitude of the negative pulses in the signal 46 to a level of −1 volt by using a −1 voltage reference level. As shown in FIG. 2, the negative peak detector 52 works with the control unit 50 to vary the gain and negative excursion of the signal 46 outputted by amplifier 48.

The negative peak detector 52, the positive peak detector 54, and the base line control unit 44 operate to transform the signal 46 into an output signal 60 which is a rectangular waveform having stabilized positive and negative values, i.e. +1 volt and −1 volt, and being independent of any variations in the transparency of the soundtrack area 4 on the film 6. For optimum performance, the rectangular waveform 60 should only be dependent on the pulse width modulation of the original sound information 10.

Figure 3B:
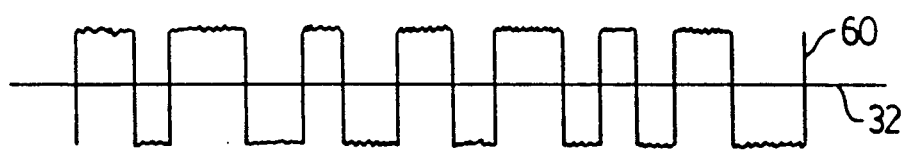
Figure 3C:
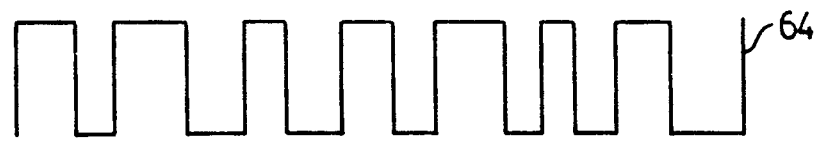
Figure 4A:
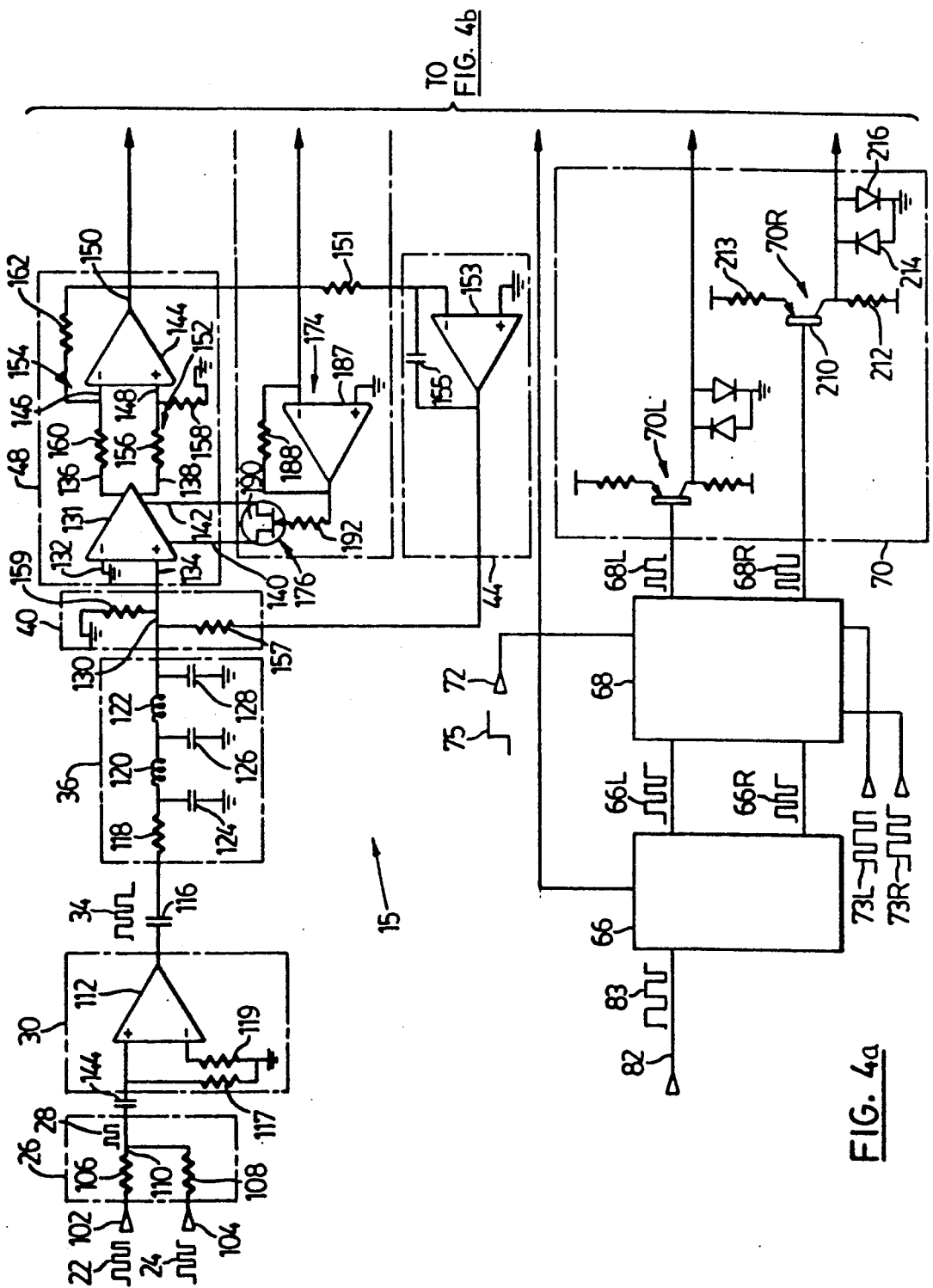

The output signal 60 from the summation unit 58, while being a stabilized rectangular waveform, still may be noisy, as depicted in FIG. 3b. To eliminate some of the noise from the signal, the invention includes a zero crossing detector 62 as shown in FIG. 2. The zero crossing detector 62 (or comparator 62) has the characteristic of limiting the amplitude of the input signal, and thereby reducing some of the noise imposed on the signal 58 to produce a cleaner output signal as indicated by 64, as shown in FIG. 3c.

As is apparent, the signal 64 has been converted from the variable area encoded signal 10 which comprises right and left channel 10R,10L to a time multiplexed signal. On the original soundtrack, the left and right stereo channels were separated spatially, i.e. they occupied separate strips 10R,10L of the film 6. Upon being read by the photodetector array 12 the two channels are encoded as an electrical signal 28 with the left and right channel information being interweaved in the signal 28, i.e. displaced in time relative to each other, and the output signal 64 retains this time-multiplexed characteristic. To recover the audio information originally encoded as right and left channels in the variable soundtrack 4, it is necessary to demultiplex the time multiplexed signal 64 into left and right channels. For this processing, the invention includes a left/right channel demultiplexer 66 which connects to the output of the zero crossing detector 62. The demultiplexer 66 produces a right channel signal 66R and a left channel signal 66L as will be discussed below.

The left/right channel demultiplexer 66 also includes two control inputs. The first input is the decode select line 72. The decode select line 72 determines the type of processing for the signal 64, i.e. digital or analogue. If the signal 64 is in digital format, then the signal 64 is routed to a digital signal processing circuit 73. The decode select line 72 is controlled by a synchronizing logic block 74.

As mentioned above, the circuit 15 converts the original optically encoded sound information 10 into a time-multiplexed electronic signal 64. Thus, to demultiplex the signal 64, it is necessary to use a time base which is related to the photodetector array 12 clock rate and the carrier frequency of the original sound information 10. The optical sound information 10 is sampled at 27 MHz by the photodetector array 12 having 1024 photoelements, i.e. pixels (not shown), thereby giving a 52.7 KHz sound information carrier frequency. Thus, it is necessary to divide the photodetector array 12 clock rate to the original 52.7 KHz carrier frequency. As shown in FIG. 2, the circuit includes a divide-by-512 counter 76. The counter 76 has two inputs, one for the CCD clock at 78 and one for the transfer clock reset at 80. The counter 76 is reset for every scan by the transfer clock reset. Thus, if N is 512, representing a CCD photodetector array 12 having 1,024 pixels, then the counter 76 will generate one cycle per CCD scan, with a digital high position switching the left channel and a low switching the right channel. The output of the counter 76 connects directly to the left/right demultiplexer 66 by line 82.

Respective sixth order low pass filters 84,86 are provided for the left and right hand audio channels. These filters 84,86 are for removing the CCD scanning frequency from the audio content in the left and right channel signals 68,70, and therefore to remove signal aliasing For example, if the CCD has 1,024 pixels and the CCD transport clock is 27 MHz, then the scanning frequency for the clock transferring frequency is 52.73 KHz. If the maximum audio frequency is 20 KHz, the filters 84,86 may have to attenuate the scanning frequency by 60 DB or more for a signal ratio of 2.64. The right and left channel outputs from the respective filters 84,86 feed into the next stage which comprises a pair of emphasis filters 88,90. The function of the emphasis filters is to compensate for variations in the optical response of the photodetector array 12. The emphasis filters 88,90 outputs respective processed left and right channel signal 89L,89R.

Reference will now be made to FIGS. 4, 5, 6, 7a, 7b, and 8, which detail the electronic implementation of the previous functional blocks. For ease of reference, the electronic circuits will be described in conjunction with the previous block diagrams using the same reference numerals to indicate the functional blocks in FIG. 2 corresponding to the principle and discrete components in the following FIGS.

In FIG. 4, the overall circuit is again indicated by 15. The circuit 15 includes an odd pixel input 102 and an even pixel input 104 from the photodetector array 12. The pixel inputs 102,104 feed into the first summation unit 26. As was discussed above, the odd and even pixel streams 22,24 from the photodetector array 12 are 90° out of phase. The summation unit 26 is necessary to bring the odd and even pixel streams 22,24 back into one signal 28 or phase. The summation unit 26 can be implemented by using first and second resistors 106,108, which are connected at node 110 and provide the interweaved signal 28 which is fed into the next stage.

As shown in FIG. 4, the AC amplifier stage 30 of the circuit 15 includes a first video amplifier 112. Since the photodetector array 12 is being clocked at a relatively high rate, i.e. 27 MHz, the amplifier 112 should have a wide bandwidth and require little frequency compensation. A suitable device is the LM733C Differential Video Amplifier manufactured by National Semiconductor. The LM733C has inverting and non-inverting inputs and a differential output. As shown in FIG. 4, the amplifier 112 is AC coupled to the summation unit 26 using a capacitor 114. The capacitor 114 connects the node 110, i.e. the output of summation unit 26 to the non-inverting input of the amplifier 112. Another capacitor 116 couples the differential output of the amplifier 112 to the filter stage 36. The AC coupling is necessary because the LM733C doesn't perform optimally if there is DC loading. As shown in FIG. 4, the amplifier 112 includes resistors 117,119 on its non-inverting and inverting inputs respectively. The resistors 117,119 help stabilize the input current to the amplifier 112. The LM733C amplifier 112 also includes a selectable gain function using a number of gain select pins (not shown). In the present embodiment, the gain of the amplifier 112 is 400 which is selected merely by leaving the gain select pins (not shown) open.

As mentioned, the output of the amplifier 112 feeds into the filter stage 36 through the capacitor 116. The filter stage comprises the fifth order Chebyshev filter. The function of the filter 36 is to remove the 54 MHz carrier signal which is imposed by the clocking of the output structure of the photodetector array 12. As shown in FIG. 4, the filter 26 can be implemented using resistors 118,159, first and second inductors 120,122 and three capacitors 124,126,128. The filter 26 attenuated the input signal 34 to yield the attenuated signal 38 which is fed to the summation stage 40 at node 130.

As shown in FIG. 4, the summation unit connects to the next stage which is the variable gain amplifier stage 48. This stage comprises first and second gain amplifiers 131,144. A suitable device for the variable gain amplifiers 131,144 is the LM733C and LF357, respectively, manufactured by National Semiconductor. As depicted in FIG. 4, the first gain amplifier 131 has an inverting input 132, and a non-inverting input 134, first and second differential outputs 136,138, and first and second gain selection pins 140,142. The variable gain amplifier 131 interfaces to the fifth order filter 36 at node 130. The amplifier 131 also interfaces to the second differential gain amplifier 144, the zero base line circuit 44 and the automatic gain control network 50.

Considering first the inputs 132,134 to the variable gain amplifier 131, as shown in FIG. 4, the output from the filter 36 connects to the non-inverting input 134 of the amplifier 131. The inverting input 132 connects to signal ground or reference. The two differential outputs 136,138 are inputs into the second gain amplifier 144. The differential gain amplifier 144 has an inverting input 146, a non-inverting input 148 and an output 150. As shown in FIG. 4, the amplifier 144 includes a resistor network 152 on its non-inverting input 148 and another resistor network 154 on its inverting input 146. A suitable device for the differential gain amplifier 144 is the LF357 series JFET input operational amplifiers manufactured by National Semiconductor. As is known, JFET (junction field effect transistor) input stage operational amplifiers offer significant performance characteristics. In this application, the circuit 15 exploits the very low noise characteristics, low input bias and offset current features of the LF357. In addition, the LF357 has a very wide bandwidth, i.e. 20 MHz which is required to maintain the integrity of the signal 28.

Referring still to FIG. 4, the differential gain amplifier 144 provides a differential gain function between the variable gain amplifier 131 and the next stage of the circuit 100. The first resistor network 152 comprises a first resistor 156 and a second resistor 158 which connect the second differential output 138 to the non-inverting input 148 of the amplifier 144. The second resistor network 154 also comprises a first resistor 160 and a second resistor 162. The first resistor 160 connects the first differential output 136 to the inverting input 146 of the amplifier 144. The second resistor 162 connects between the inverting input 146 and the output 150, which as is known, provides a negative feedback function. In the preferred embodiment, the values of the resistors 156,158,160,162 are chosen such that the closed loop gain of the amplifier 144 is 10.

As shown in FIG. 4, the output 150 of the amplifier 144 also feeds into the zero base line control circuit 44 through an input resistor 151. The zero base line control circuit comprises an operational amplifier 153 which is configured as an integrator with a feedback capacitor 155. The non-inverting input 148 of the amplifier 153 is connected to ground to give a zero volt reference.

The negative peak detector circuit indicated by 52 follows the negative excursion of the signal 60. The negative peak detector circuit 52 together with the automatic gain control circuit 50 and the positive peak detector circuit 54 stabilize the positive and negative excursions of the signal 60 to +1 volt and −1 volt respectively, and limit the amplitude modulation of the signal 60. Amplitude modulation of the signal 60 occurs in the stage having the fifth order filter 36. The coupling capacitor 116 and the summing resistor 157 introduce a DC level which varies with the signal 34. As the DC level varies, i.e. moves up and down, the signal 34 behaves as if being amplitude modulated. To limit the amplitude modulation effect, it is necessary to clip the negative and positive excursion, and to establish a zero base line, so that the resulting signal 60 is symmetrical and constant about the zero base line, with the only modulation being in the pulse width of the signal 60.

As shown in FIG. 4, the negative peak detector circuit 52 couples to the automatic gain circuit 50 at node 164. The peak detector circuit 52 comprises a diode 166 and a capacitor 168. To detect a negative going pulse, the anode of the diode 166 is connected to the capacitor 168. When the negative portion of the signal 60 is present at node 164, the diode 166 conducts and the capacitor 168 negatively charges until the diode 166 turns off. Once the diode 166 turns off, the capacitor 168 retains the negative charge corresponding to the lowest negative excursion of the signal 60.

The capacitor 168 feeds the automatic gain circuit 50 through an input resistor 170 as shown in FIG. 4. The automatic gain circuit 50 includes three stages: a stabilization stage 172, a level shift stage 174, and a gain control stage 176. The stabilization stage 172 comprises a differential amplifier 178, a feedback network 180, and a voltage reference 182. As shown in FIG. 4, the input resistor 170 couples the peak detector 52 to the inverting input of the amplifier 178. The non-inverting input of the amplifier 178 connects to the voltage reference 182. The voltage reference 182, as shown, has first and second resistors 184,186 which together comprise a voltage divider. In the present embodiment, values of the resistors 184,186 are chosen such that a reference of 0.3 volts is applied to the non-inverting input of the amplifier 178.

The function of the network 180 is two-fold. First, the network 180 sets a negative bias for the operation of the JFET transistor in the gain control stage 176, as will be discussed. Second, the feedback network 180 provides a forward phase shift. As is evident to one skilled in the art, a forward phase shift is necessary to counteract the negative phase shift caused by the combination of the JFET and the negative peak detector 52.

Referring still to FIG. 4, the network 180 utilizes a diode 181 to prevent a positive voltage from appearing on the gate of the JFET in the gain control stage 176. The diode 181 has its anode connected to the inverting input of the amplifier 178 and its cathode connected to the output of the amplifier 178.

To provide the forward phase shift function, the feedback network 180 includes a capacitor 183 and a resistor 185. As shown in FIG. 4, the capacitor 183 and the resistor 185 are connected in series in the negative feedback loop of the amplifier 178. The component values of the capacitor 183 and the resistor 185 are determined empirically, i.e. through performance of the circuit 15. In determining the values of the capacitor 183 and resistor 185, there must be sufficient gain through the amplifier 178 to provide linear operation, however, there cannot be too much gain, otherwise oscillation may result.

The next stage in the automatic gain circuit 50 is the level shift stage 174. The function of the level shift stage 174 is to convert the output signal from the stabilization stage 172 to a level which is suitable for the gain control stage 176. As shown in FIG. 4, the output signal from the stabilization stage 172 feeds into the level shift stage 174 through an input resistor 185. The level shift stage 174 comprises a differential operational amplifier 187 configured as an inverting amplifier with a feedback resistor 188 in the negative feedback loop. In the present embodiment, the value of feedback resistor 188 is such that the closed loop gain of the amplifier 187 is 0.5.

The third stage in the automatic gain circuit 50 is the gain control stage 176. The gain control stage 176 provides a control signal which controls the gain of the amplifier 48. As shown in FIG. 4, the gain control stage 176 comprises a junction field effect transistor 190 (JFET). As is known, a JFET is a unipolar semiconductor device in which current flows through a narrow conducting channel between two electrodes known as the source and drain. The current is modulated by an electric field applied to a third electrode, known as the gate. In operation, the channel can act as a resistor and be controlled by varying the gate voltage.

As discussed above, the amplifier 131 includes a selectable gain function which depends on the resistance value applied to the gain select pins 140,142. As shown in FIG. 4, the source and drain of the JFET 190 connect to the gain select pins 140,142 of the amplifier 131, and the output from the amplifier 187 and the level shift stage 174 connect through a resistor 192 to the gate of the JFET 190. For an n-channel JFET, the resistance between the source and drain increases as the gate voltage increases, and an increase resistance causes the gain of the amplifier 131 to decrease. Thus, for large signal excursions, the gain of the amplifier 131 will be lower and consequently any associated noise will not be amplified and passed through the circuit 15.

Considering next the positive peak detector circuit 54, the circuit 54 follows the positive portion of the signal 60 present at node 164. The positive peak detector circuit 54 connects to the node 164. As shown, the peak detector circuit 54 comprises a diode 194, a capacitor 196, an input resistor 198, a reference voltage network 200, a feedback network 202, an output resistor 204, and an operational amplifier 206. The operational amplifier 206 is a differential amplifier having a non-inverting input, an inverting input, and an output. As is known, the peak detector function occurs through the diode 194 and the capacitor 196. A positive portion of the signal 60 causes the diode 194 to conduct, thereby charging the capacitor 196. As the capacitor 196 charges there is a voltage across the input resistor 198 which is applied to the inverting input of the amplifier 206. The voltage level on the output of the amplifier 206 is a function of the voltage on the inverting input and the reference voltage on the non-inverting input. The resistor network 200 sets up the reference voltage using a simple voltage divider arrangement comprising first and second resistors 201,203. In the present embodiment, the reference voltage is 0.3 volts. The amplifier 206 produces a positive correcting signal 207 which feeds through the resistor 204 to node 164. The correcting signal 207 has an amplitude of +1 volt.

The signal 60 at node 64 is summed with the correcting signal 207 through resistors 204,205. The signal 207 removes the amplitude modulation by providing an equal but opposite tracking signal, and thereby maintaining the signal level at +1 volt. As discussed, amplitude modulation of the signal 60 occurs in the stage containing the fifth order filter 36. The summing resistor 157 in the filter 36, the amplifier 174 and input capacitor 116 act together to create a DC level which slowly moves up and down to correct component value changes either due to temperature or aging. This up and down excursion also produces amplitude modulation of the signal 60, which is an undesirable effect. Thus, by limiting the positive excursions to +1 volt using the correcting signal 207 and the negative excursions to −1 volt of the signal 60, along with establishing a zero base line, a stabilized signal as indicated by 60 is produced at node 164.

The signal 60 at node 164 takes the form as shown in FIG. 3c. The signal 60 has an average value of 0 volts from the zero base line circuit 44, and the positive peak and negative peak are at +1 volt and −1 volt respectively. As can be seen, the resulting signal 60 is symmetrical about the zero base line. The positive peaks of the signal 60 correspond to opaque regions on the film 6 and the negative peaks correspond to transparent regions on the film 6.

The signal 60 at node 164 is next fed into the zero crossing detector or comparator 62. The function of the zero crossing detector 62 is to put the level of the signal 60 into a digital form. A suitable device for the detector 62 is the LM311 comparator manufactured by National Semiconductor. The comparator 62 has an inverting input, a non-inverting input, and an output. The non-inverting input is connected to ground or reference. The signal 60 from node 164 is applied to the inverting input of the comparator 62. The comparator 62 produces an output signal 64 which is a function of the difference between the inverting and non-inverting inputs. To maintain the proper logic values, a resistor 208 "pulls-up" the output of the comparator 62 to +5 volts.

Figure 8:
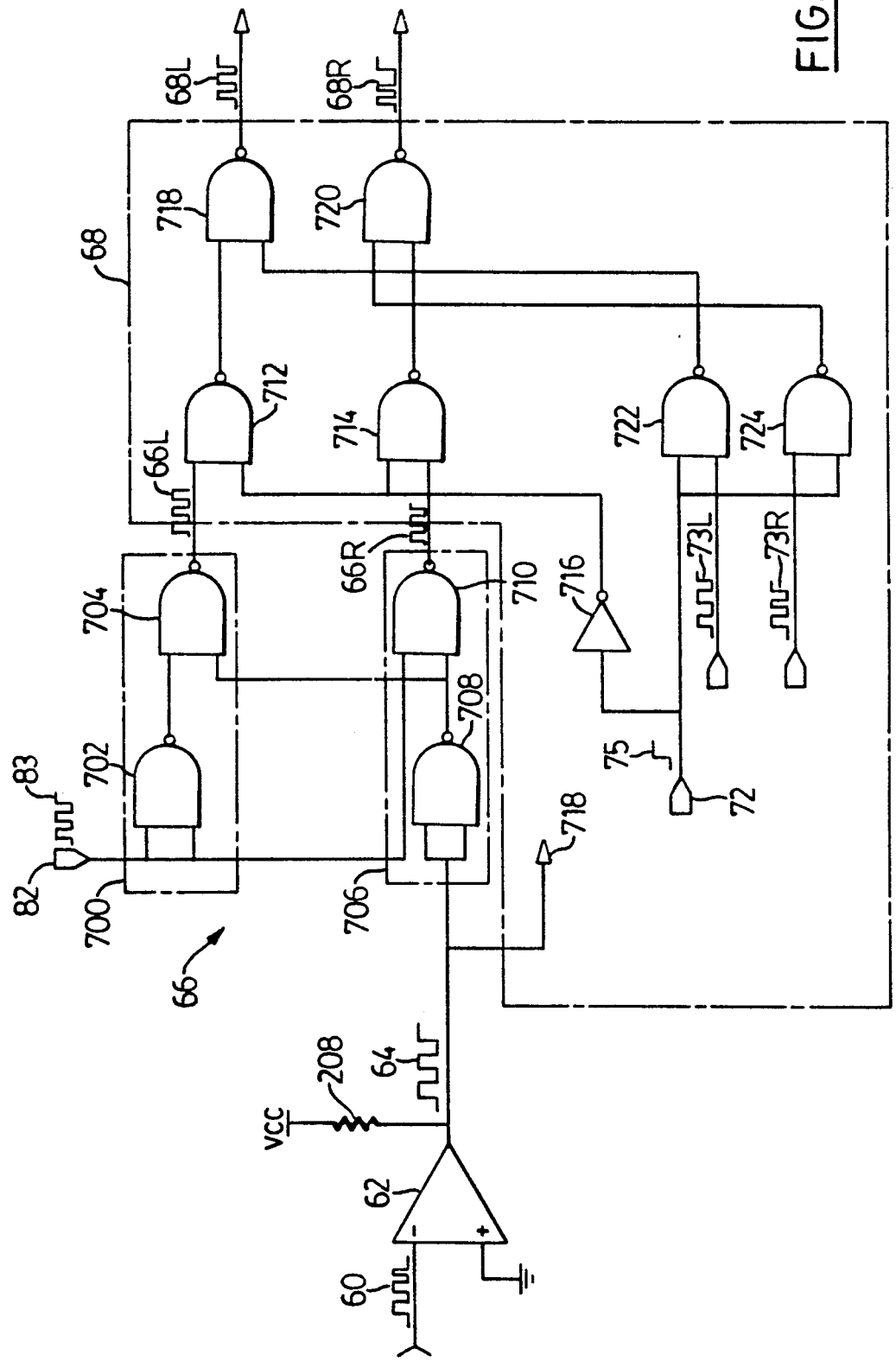
FIG. 8 is an electronic schematic diagram of the left/right channel demultiplexer logic included in the electronic circuit of the present invention.

The comparator 62 feeds the converted signal 64 into the next stage which is the left/right channel demultiplexer 66. The function of the demultiplexer 66 is to separate the signal 64, which is time-multiplexed, into the right and left channel signals 66L,66R. Referring to FIG. 8, the demultiplexer 66 is shown at the logic gate level. The demultiplexer 66 comprises a left channel demultiplexer 700 and a right channel demultiplexer 706. As shown in FIG. 8, the demultiplexer 66 can be implemented using four NAND logic gates 702,704,708,710. The left channel 700 uses two gates 702,704 and the right channel 706 also uses two gates 708,710. The right and left channel demultiplexers 700,706 have the same structure, and therefore only the right channel demultiplexer 706 will be described.

Referring still to the demultiplexer 66 shown in FIG. 8, the first gate 708 accepts the signal 64 outputted from the comparator 62. With the two inputs of the NAND gate 708 tied together, the gate 708 inverts the signal 64 from the output of the comparator 62. The output of the first NAND gate 708 feeds into the second NAND gate 710 and is logically "ANDED" and "INVERTED" with the demultiplexing control signal 82 generated by the transfer clock circuit 76.

As discussed above, the transfer clock circuit 76 generates the pulses to clock the data from the photodetector array 12 and to reset the output structure of the photodetector array 12. The circuit 15 uses the transfer clock circuit 76 to also generate the demultiplexing control signal 82 in order to retain the time synchronization between the time-multiplexed signal 64 derived from the photodetector array 12 and the right and left channel signals 10R,10L of originally encoded sound information 10. As shown in FIG. 8, the gate 710 outputs an analogue right channel signal 66R, and similarly, the gate 704 for left channel demultiplexer 700 outputs an analogue left channel signal 66L. The signals 66R,66L feed into the next stage which is the digital-/analogue control stage 68 to be discussed below.

Referring still to FIG. 4, the circuit 15 can include a power line suppression circuit 70 which couples to the digital/analogue control stage. The function of the power line noise suppression circuit is to remove noise which may be picked up from the power supply rail. When the gates in the demultiplexer 66 are turned on, the output transistor (not shown) of the gates are driven into saturation, and may pick up noise from the power supply rail. To remove this noise, the suppression circuit 70 includes right and left channel suppressors 70L,70R as shown in FIG. 4. The suppressors 70L,70R are identical and therefore only the right channel suppressor 70R will be described. The right channel suppressor 70R has a transistor 210, first and second resistors 212,213 and first and second diodes 214,216. The resistors 212,213 set up the bias currents for the transistor 210, as is known to one skilled in the art. As shown in FIG. 4, the two diodes 214,216 are connected in parallel with opposite polarities.

Referring still to FIG. 4 for operation of the suppressor 70R, first consider when the transistor 210 is OFF, i.e. the signal 68R is a logic one. In this case, the first diode 214 conducts through the resistor 212 to the negative supply rail. The diode 214 used has a dynamic impedance of 5 ohms, therefore, using a value of 2.4 Kohms for the resistor 212, the attenuation of negative noise is a factor of 480.

When the signal 68R is a logic zero, the transistor 210 turns ON, i.e. the base-collector junction is forward biased. In the ON state, the transistor 210 acts as an ideal current source and with the dynamic impedance of the second diode 216, which is forward biased, the noise on the line is shunted to ground. The operation of the left channel suppressor 70L is identical and the outputs of the suppressors 70L,70R feed into the next stage which comprises the left and right filters 84,86.

Referring now to FIG. 5, the sixth-order Chebyshev filters, indicated by 84,86 in FIG. 4, are shown in detail. The function of the filters 84,86 is to demodulate the pulse width modulated signals 66R,66L into their original formats. The fundamental frequency of the signals 66R,66L are 52.7 KHz which is centered about the modulated side bands for the left and right channels. The filters 84,86 effectively remove the carrier frequency of 52.7 KHz so that the original audio information, i.e. the sinusoidal wave form, in the band up to 20 KHz can be recovered.

Since both the left and right filters 84,86 are identical, only the operation of the right channel filter 86 is given. In the preferred embodiment, the sixth-order filter 86 is implemented using active components, i.e. differential amplifiers. As shown in FIG. 5, three active component stages 300,302,304 are required to implement the sixth-order filter. A suitable device for implementing this filter is the LF353 amplifier manufactured by National Semiconductor. Referring to the first stage 300, there is a differential amplifier 306 having an inverting input, a non-inverting input, and a differential output. An input resistor 308 connects to the inverting input and to the differential output of the amplifier through a first capacitor 310. The input resistor 308 also connects to the non-inverting input of the amplifier 306 through a second resistor 312. The non-inverting input of the amplifier 306 also connects to signal ground through a second capacitor 314. The differential output of the amplifier, in turn, connects to the second stage 302 of the filter 86 through an input resistor 316.

As for the first stage, the second stage of the filter includes a differential amplifier 318 having an inverting input, a non-inverting input, and a differential output. The input resistor 316 connects to the inverting input and to the differential output through a first capacitor 320. The input resistor 316 also feeds the non-inverting input through a second resistor 322 and there is also a capacitor 324 connecting the non-inverting input to signal ground. The output of the amplifier 318 connects to another input resistor 328. The third stage is the same in structure, and has a differential amplifier 326 which is connected to the input resistor 328, a first capacitor 330, a second resistor 332 and a second capacitor 334, as shown in FIG. 5.

In the preferred embodiment of the present invention, the attenuation desired from the filter 86 is 60 dB with a ±1 dB ripple in the low pass band. As is known to one skilled in the art, a sixth-order Chebyshev filter topography can be implemented to achieve these characteristics. In the preferred embodiment, the component values for the filter 86 have been chosen as shown in TABLE I attached. As will be appreciated the operation and component values for the left channel filter 84 are identical to those of the right channel filter 86.

TABLE I

| COMPONENT | VALUE |
|---|---|
| Resistors (308, 312, 316, 322, 328, 332) | 2.7 Kohm |
| Capacitor (310) | 0.039 μF |
| Capacitor (314) | 220 pF |
| Capacitor (320) | 0.015 μF |
| Capacitor (324) | 0.0011 μF |
| Capacitor (330) | 0.01 μF |
| Capacitor (334) | 0.0056 μF |

Referring now to FIG. 4, the circuit 15 includes the pair of emphasis filters 88,90 for the left and right audio channels respectively. The function of the emphasis filter 88 is to restore the losses resulting from converting the light energy to charge packets in the photodetector array 12. Certain losses are inherent in the operation of photodetector 12 because of the way the array processes the optical signal. Moreover, it has been found that these losses vary with the frequency of the decoded optical signal 28.

The emphasis filters 88,90 provide a high pass active filter function. As shown in FIG. 4, in the preferred embodiment of the present invention there are separate emphasis filters for the right and left channels respectively. The emphasis filters 88,90 are identical and for ease of explanation only the right channel emphasis filter 90 will be described.

Referring now to FIG. 6, the emphasis filter 90 is shown in detail. The emphasis filter 90 comprises first and second operational amplifiers indicated by 400,402 respectively. The emphasis filter 90 is coupled to the previous stage, i.e. sixth-order filter 86, through a potentiometer 404. The potentiometer 404 allows the response of the filter 90 to be adjusted to emphasize the particular frequency components of the signal 28 which have been affected by the photodetector array 12.

The first amplifier 400 couples to the wiper of the potentiometer 404 through a capacitor 406 and an input resistor 408 which connects to the inverting input of the amplifier 400. The non-inverting input of the amplifier 400 is tied to signal ground. The first amplifier 400 also includes a feedback resistor 410 across the inverting input and output of the amplifier 400. In addition, there is a bypass resistor 412 which also connects to the wiper of the potentiometer 404 and the inverting input of the amplifier 400.

As mentioned above, the function of the emphasis filter 90 is to emphasize the frequency component of the demodulated signal 28 which has been affected by the response of the photodetector array 12. In the following description, two conditions will be described. The first involves emphasizing a low frequency component of the signal 28, and the second condition involves emphasizing a high frequency component of the signal 28.

To emphasize the low frequency components of the signal 28, the wiper of the potentiometer 404 is moved to say the center, i.e. positioned above ground potential. For a low frequency component, the capacitor 406 acts as an open circuit and blocks the signal path through the input resistor 408. The signal flows through the bypass resistor 412 and the feedback resistor 410. In the preferred embodiment the bypass resistor 412 and feedback resistor 410 have identical values, and therefore the signal at the output of the amplifier 400 has unity gain.

Similarly, for the second amplifier 402, there is an input capacitor 414 and an input resistor 416 which couple the output from the first amplifier 400 to the inverting input of the second amplifier 402. There is also a second bypass resistor 418 which connects the output from the first amplifier 400 to the inverting input and a feedback resistor 420 across the inverting input and output of the amplifier 402. The operation of the second amplifier 402 is identical to the first amplifier 400. For low frequency signal components, the input capacitor 414 blocks the signal path through the input resistor 416 to the inverting input of the amplifier 402, and the signal flows through the bypass resistor 418 and the feedback resistor 420 which are chosen to provide unity gain.

As shown in FIG. 6, the output of the second amplifier 402 connects to a first summing resistor 422 in series with an inductor 424. A second summing resistor couples the input signal from the filter 86 to the other terminal of the inductor 424. The function of the summing resistors 422,426 are to sum the audio signal 84R with the frequency component which has been enhanced by the emphasis filter 90 to produce the output audio signal 92R.

The emphasis filter 90 also includes a signal output resistor 428 which together with the first summing resistor 422 attenuates the output audio signal 92R. As is known, the attenuation factor can be varied by the resistance values of the output resistor 428 and the summing resistor 422. In the preferred embodiment, the attenuation factor is 21 when measured across the output resistor 428.

Referring still to FIG. 6, the function of the inductor 424 is to provide a filter function. As is apparent to one skilled in the art, there is a 27 MHz signal being processed by the circuit 15. A high frequency signal creates electromagnetic interference. To obviate the EMI effects, there are two possible methods which may be used. The first method involves physical shielding of the circuit 15 using ground planes and covers. The second method involves filtering the signal paths electronically. In the preferred embodiment, the second method is chosen as will be discussed below.

To emphasize higher frequency components of the audio signal 84R, the wiper of the potentiometer 404 is moved upwards to yield a potential above ground. To emphasize the highest frequency component of the audio signal 84R, the wiper is set at the top. For high frequency inputs, the input capacitor 406 comes into play since the series impedance of the capacitor 406 and the input resistor 408 is less than the resistance of the bypass resistor 412. As is evident to one skilled in the art, the reactance values of the capacitors 406,414 will vary with the audio signal frequency.

In the first case, the capacitive reactance values of the capacitors 406,414 are much greater than the respective resistance values of resistors 412,418. In the preferred embodiment, the values of the capacitors 406,414 and resistors 412,418 are chosen such that the audio signal 84R from the potentiometer 404 is amplified by a gain of 1.0 by both amplifiers 400,402. As discussed above for the low frequency component of the audio signal 84R, the summing resistor 422 attenuates the signal output from the second amplifier 402 by a factor of 21. Since the signals in the first summing resistor 422 and in the second summing resistor 426 are in phase, the attenuation of the signal at the output resistor 428 is cut in half, i.e. a factor of 10.5. The attenuation factor of 21 is cut in half because the original audio signal 84R through the second resistor 426 is summed with the attenuated signal in the first summing resistor 422.

In the second case, the frequency of the audio signal 84R is such that the capacitive reactance values of the capacitors 406,414 are much less than the respective resistance values of the resistors 412,418. In the preferred embodiment, the values of the capacitors 406,414 and resistors 412,418 are such that for the low range of high frequency components in the audio signal 84R, the gain of the first amplifier 400 is 68 and the gain of the second amplifier 402 is 11 when measured between the wiper of the potentiometer 404 and output of the second amplifier 402. For audio signal 84R frequencies between the two extremes discussed above, the resulting reactance values of the capacitors 406,414 will produce gains from unity to 748 when measured between the wiper of the potentiometer 404 and the output of the second amplifier 402.

In the preferred embodiment, the values of the bypass resistors 412,418 and the input capacitors 406,414 are such that there is a frequency breakpoint at 650 Hertz, i.e. the gain of the first amplifier 400 begins to increase from unity with the frequency of the audio signal 84R. For the second amplifier 402, the frequency breakpoint is 6500 Hertz. For the inverting input of the first amplifier 400, the input capacitor 406 and input resistor 408 values are chosen to yield a frequency breakpoint of 44 KiloHertz. For the second amplifier 402, the frequency breakpoint produced by the input capacitor 414 and the input resistor 416 is 72 Kilo-Hertz. The audio signal 84R having these frequency components causes the gains in the first and second amplifiers 400,402 to reach their maximum values.

As discussed above, there is a 27 MHz signal racing around the circuit 15 resulting from the 27 MHz clock for the photodetector array 12. Such a 27 MHz signal can cause electromagnetic interference (EMI) which can radiate from the circuit 100 and cause interference with other electrical/electronic devices (not shown). To minimize the EMI effects, the emphasis filter 90 includes a low pass filter 430. As shown in FIG. 6, the low pass filter 430 comprises the inductor 424, a second inductor 432 and a capacitor 434. As is known, the capacitor 434 and the inductors 424,432 are configured to provide a low pass filter function with the passband being below 27 MHz, and thereby filtering or eliminating any 27 MHz frequency components from the output audio signal 92R. In the alternative, the EMI effects can be reduced by physically shielding the circuit using known methods such as enclosures and ground planes.

The circuit 15 includes the capability to decode and process digitally encoded soundtracks. For digital soundtracks, the signal 64 on the output of the comparator 62 feeds into the digital signal processing circuit (DSP) circuit indicated by 73 in FIG. 2. The DSP circuit 73 produces a right channel digital signal 73R and a left channel signal 73L which are fed back into the demultiplexer circuit 66 and outputted through the left and right audio channels, as will be discussed below. An analogue/digital control signal 75 on line 72 controls the processing of digitally encoded soundtracks and analogue encoded soundtracks. The control signal 75 is derived from synchronizing bars (not shown) which are present in the soundtrack 10 in digital encoded format.

Referring back to FIG. 2, the control signal 75 is generated by a synchronization control circuit 74 which controls the digital/analogue decoding. The control signal 75 feeds into both the demultiplexer circuit 66 and the DSP circuit 73, as will be discussed below. In the preferred embodiment of the present invention, the control signal 75 is a LOGIC 1 when there is digitally encoded sound information, and conversely a LOGIC 0 when there is analogue encoded sound information. The digital/analogue decode control circuit 74 also produces a voltage controlled oscillator output signal 77 on line 79 which is used by the DSP circuit 73.

Figure 7A:
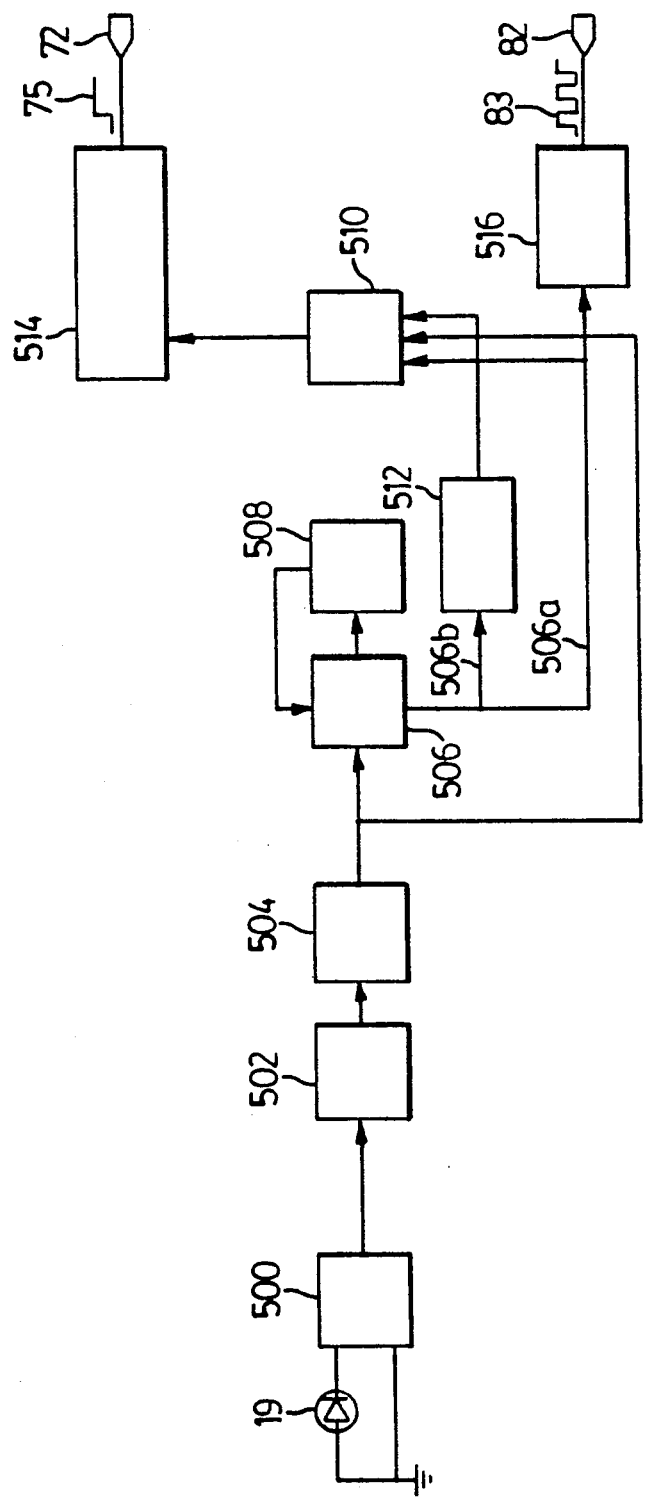
FIG. 7a is a schematic block diagram of the digital-/analogue decode control circuit of the present invention.
Figure 7B:
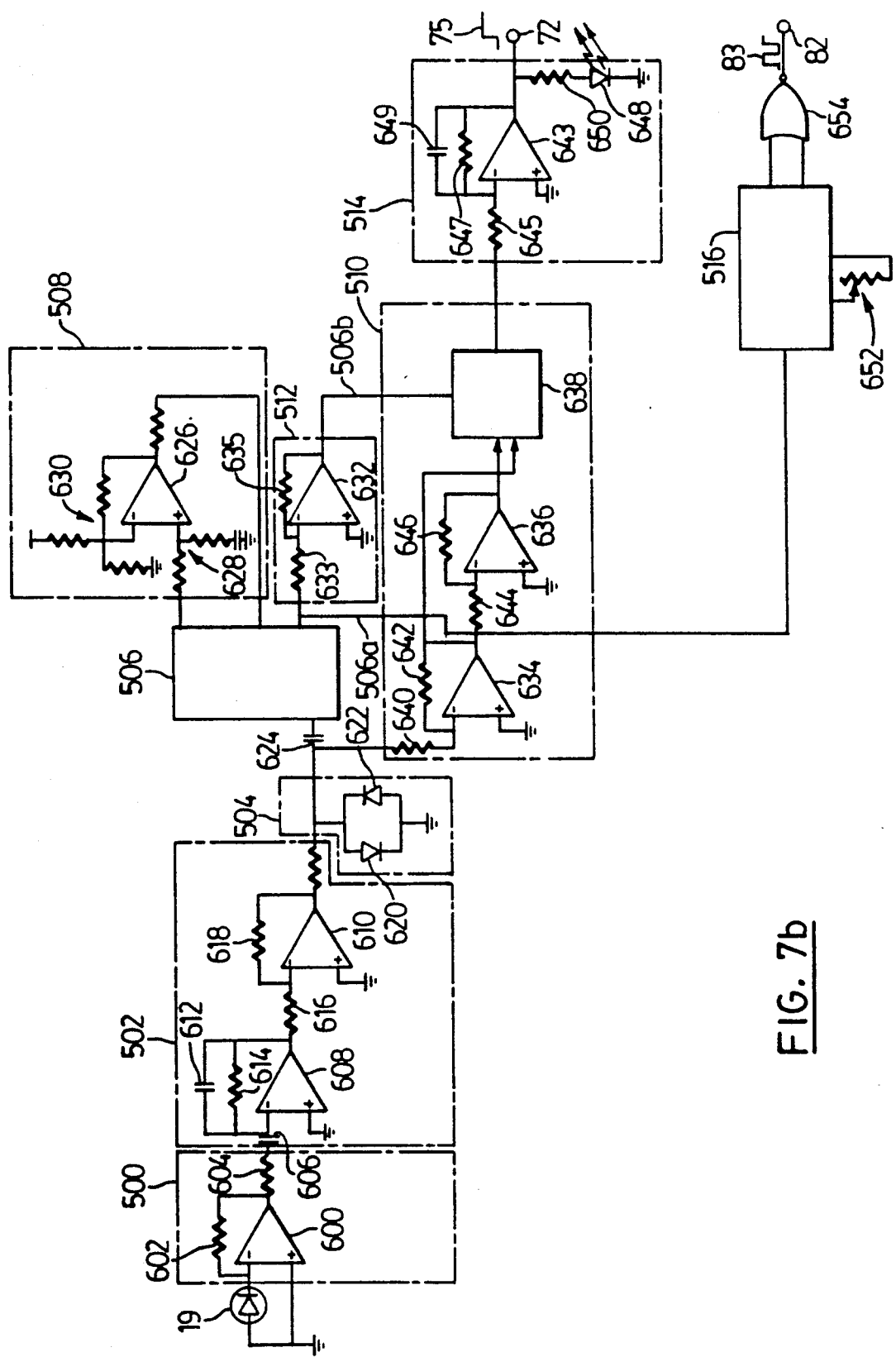

The digital decoding capability of the circuit 15 will be explained in greater detail by first considering the digital/analogue decode control circuit 74 shown in FIGS. 7a and 7b, and then, the demultiplexer circuit 66 shown in FIG. 8. FIG. 7a is a schematic block diagram of the decode control circuit 74, whereas FIG. 7b is an electronic schematic diagram of the circuit 74. For ease of explanation, the functional blocks in FIG. 7a are denoted by broken line boxes using the same reference numbers as in FIG. 2.

Referring first to FIG. 7a, the PIN photodiode 19 generates a signal as a result of the incident light beam 18 from the beam splitter 16. The signal from the photodiode 19 feeds into the first stage which comprises a PIN amplifier stage 500. The function of the PIN amplifier stage 500 is to bring the signal from the photodiode 19 to a level suitable for further processing. As will be appreciated by one skilled in the art, the PIN photodiode 19 offers optimum sensitivity and frequency response thereby generating an inherently strong or consistent signal. The output of the PIN amplifier 500 feeds into the next stage which comprises a bandpass amplifier bank 502 and an amplitude limiter 504. The function of this stage is twofold. First, the bandpass amplifier bank stage 502 filters the output signal from the PIN amplifier 500, using a center frequency of 53 KHz since the frequency of the synchronization bars (not shown) encoded in the soundtrack is 53 KHz. Secondly, the bandpass filter bank 502 further amplifies the level of the output signal from the PIN amplifier 500. The bandpass filter bank 502 produces a strong signal indicative of the synchronizing bars (not shown). The signal from the filter bank 502 is then amplitude limited by the amplitude limiter 504.

The clipped signal from the limiter 504 feeds into the next stage which comprises a phase locked loop (PLL) circuit 506. The function of the phase locked loop circuit 506 is to detect the presence of synchronizing bars (not shown) in the signal outputted from the previous stage. As previously discussed, synchronizing bars at a frequency of 53 KHz indicate a digitally encoded soundtrack. In addition to detecting the presence of synchronizing bars, the phase locked loop 506 reduces the bandwidth of the clipped signal, thereby increasing the signal-to-noise ratio. As shown in FIG. 7a, the PLL 506 works in conjunction with an error amplifier 508, as will be discussed in detail below.

The output of the PLL 506 feeds into a phase detector circuit 510. As shown in FIG. 7a, the output of the PLL 506 provides two inputs 506a,506b to the phase detector 510. The first input 506a feeds directly into the phase detector 510, whereas the other input 506b first goes through an invertor 512 before being fed into the phase detector. The output of the phase detector 510 feeds into an integrator circuit 514 which produces the control signal 75. As shown in FIG. 7a, the output from the PLL 506 also feeds into a phase shifter 516. The function of the phase shifter is to generate a transfer clock signal 81 on output line 82.

Referring now to FIG. 7b, the circuit blocks in FIG. 7a will be explained in detail. The PIN amplifier 500 is an operational amplifier 600 configured as an inverting amplifier with a feedback resister 602 in the negative loop and an output resistor 604. The component value of the feedback resister 602 is chosen such that the output signal from the PIN photodiode 19 is amplified to a suitable level for further processing. A suitable device for the PIN amplifier 500 is the LF355 series amplifier manufactured by National Semiconductor Corporation.

The output from the PIN amplifier 500 feeds into the bandpass amplifier bank 502 through a capacitor 606. As is known, the capacitor 606 provides AC coupling between the PIN amplifier stage 500 and the bandpass amplifier stage 502. As shown in FIG. 7b, the bandpass amplifier stage 502 comprises first and second operational amplifiers 608,610. The first amplifier 608 is configured as an active filter having a capacitor 612 and a resistor 614 in the negative feedback loop. As discussed above, one of the functions of the bandpass amplifier stage 502 is to filter the signal produced by the PIN diode 19. Since the frequency of the synchronizing bars (not shown) is 53 KHz, the component values for the capacitors 606,612 and the resistors 604,614 are chosen to provide a passband at 53 KHz.

The output from the first amplifier 608 feeds into the second amplifier 610. The second amplifier 610 is configured as an inverting amplifier having an input resistor 616 and a feedback resistor 618 in the negative feedback loop. The function of the second amplifier 610 is to amplify the filtered signal from the first amplifier 608. In the preferred embodiment, the component values of the input resistor 616 and feedback resistor 618 are chosen to provide a gain of approximately 9.

The output from the second amplifier 610 having been amplified to a suitable level is then fed into the limiter circuit 504. The limiter circuit 504 limits the amplitude of the signal generated by the second amplifier 610. As shown in FIG. 7b, the limiter circuit 504 comprises two diodes 620,622 connected in parallel with opposite polarities. As is known, this configuration of the diodes 620,622 provides amplitude limiting for both positive and negative peaks of the signal from the second amplifier 610.

The output from the limiter circuit 504 is AC coupled through a capacitor 624 to the phase locked loop circuit 506. In the preferred embodiment of the present invention, the PLL circuit 506 is the single package integrated circuit 4046 manufactured by National Semiconductor Corporation. As is known, the 4046 includes an on-chip phase detector (not shown) and an on-chip voltage controlled oscillator (not shown). As shown, the PLL circuit 506 is coupled to the error amplifier 508.

The function of the error amplifier 508 is to amplify the output from the phase detector (not shown). The output of the amplifier 508 then feeds back into the PLL circuit 506 and controls the voltage controlled oscillator (not shown). As shown in FIG. 7b, the error amplifier 508 comprises an operational amplifier 626 configured as a non-inverting amplifier having an input resistor network 628 and a negative feedback resistor network 630. The component values for the input resistor and feedback resistor networks 628,630 are chosen as required by the PLL 404b circuit specifications by National Semiconductor.

The output from the PLL circuit 506 next feeds into the phase detector circuit 510. As shown in FIG. 7b, both an inverted output 506b and a non-inverted output 506a from the PLL circuit 506 feed into the phase detector 510. The inverter 512 comprises an operational amplifier 632 configured as a unity gain negative feedback, i.e. component values of input and feedback resistors 633,635 being equal.

Referring still to FIG. 7b, the phase detector circuit 510 comprises first and second operational amplifiers 634,636 and a switch circuit 638. A suitable switch circuit is the monolithic integrated 4066 manufactured by National Semiconductor Corporation. The first and second amplifiers 634,636 connect to the switch circuit 638. The amplifiers 634,636, as shown, are configured as inverting amplifiers with unity gain, i.e. inverters, each having an input resistor 640,644 and a feedback resistor 642,646 respectively. As is known, the component values of the input resistors 640,644 and the feedback resistors 642,646 are chosen to be approximately the same for unity gain operation.

As shown, the first and second amplifiers 634,636 are cascaded, i.e. the output from the first amplifier 634 feeds into the second amplifier 636 which then connects to one of the inputs of the 4066 switch 638. The output from the first amplifier 634 connects to the other input of the 4066 switch 638 and the input for the first amplifier 634 comes from the limiter circuit 504 described above. The amplifiers 634,636, configured as inverters, together with the switch 638, form the phase detector 510 which picks up the presence of the 53 KHz synchronizing bars indicative of a digitally encoded soundtrack.

The output from the phase detector circuit 510 feeds into a subsequent amplifier 643. As shown in FIG. 7b, the amplifier 643 is configured as an integrator having an input resistor 645, a feedback resistor 647 and an integrating capacitor 649 in the negative feedback loop. The component values of the input resistor 645, feedback resistor 647 and integrating capacitor 649 are selected so as to form a narrow-band circuit centered around 53 KHz. Consequently, if the synchronizing bars are not present, i.e. the 53 KHz signal is missing or mixed with other signal frequencies removed from this narrow-band, then the output from the amplifier 643 will be a LOGIC zero. Conversely, the output from the amplifier 643 is one if the 53 KHz signal is present. The output of the amplifier 643 provides the control signal 75 on line 72.

As shown, the amplifier 643 includes a LED 648 which is connected to the output of the amplifier 643 through a resistor 650. In a known manner, the resistor 650 protects the LED 648 by limiting the current. The function of the LED 648 is to provide a visual indication of the presence of synchronizing bars. For example, if there are synchronizing bars present, the output of the amplifier 643 is a logic one and the LED 648 will be turned on.

Lastly in FIG. 7b, the output from the PLL 506 also feeds into the phase shifter circuit 516. The phase circuit 516 comprises the 74HC221 integrated circuit. The phase shifter 516 connects to a variable resistor 652 in known manner, and provides an adjustable phase shift output. The phase shifter 516 has two outputs which feed into a NOR gate 654. The output of the NOR gate 654 produces the transfer clock signal 83 and connects to the transfer clock output line 82 which is coupled to the photodetector array 12 and to the demultiplexer circuit 66 as was discussed above.

As discussed above for FIG. 4a, the signal on the output of the comparator 62 feeds into the demultiplexer logic circuit 66. The function of the demultiplexer 66 is two-fold. First, it separates the signal 64 into the original right and left channels 66R,66L, as was discussed above. Secondly, the demultiplexer 66 controls the routing of digital/analogue encoded sound information, as will be discussed in detail below.

Reference is again made to FIG. 8, which shows the demultiplexer 66 at the gate level. The output of the comparator 62 feeds into the first NAND gate 708 which is configured as an inverter, i.e. the inputs of the NAND gate 708 are tied together. The function of the NAND gate 708 is to invert the output of the comparator 62 thereby restoring it to its original phase. The output of the first NAND gate 708 feeds into the second pair of NAND gates 704,710, with one NAND gate 710 corresponding to the right audio channel and the other NAND gate 704 corresponding to the left audio channel. The other input of the NAND gate 710 connects to the transfer clock line 82, whereas for the left channel NAND gate 704, the transfer clock line 82 first feeds through the NAND gate 702 which is configured as an invertor. By inverting the signal on the transfer clock line 82 to the left channel NAND gate, a 180° phase shift is introduced which is used to separate the right and left channel audio information to produce the left and right audio signal 66L,66R.

Referring still to FIG. 8, the outputs from the right and left channel NAND gates 704,710 feed into the digital/analogue control block 68 which comprises three pairs of NAND gates. The first pair of NAND gates 712,714 each have one of their inputs connected to the outputs of the right and left channel NAND gates 710,704 respectively. The first pair of NAND gates 712,714 provide a blocking function for the analogue signals 66L,66R. As shown, the other inputs of the first pair of NAND gates 712,714 are connected to the output of an inverter 716 which is connected to the control line 72 which carries the control signal 75. As discussed above, when there is digitally encoded sound information, the control line 72 is logic one and being inverted by the inverter 716, the first pair of NAND gates 712,714 are locked at logic one until the control signal 75 changes to a logic zero, i.e. analogue encoded sound information.

Referring still to FIG. 8, the output from the comparator 62 also includes a digital signal tap line 718. The digital tap 718 connects to the DSP circuit 73 and provides an input for processing the digitally encoded sound information. As is apparent, the DSP circuit 73 uses the control signal 75 on the control line 72 to determine when to process the signal 64 on the tap 718. Once the digitally encoded sound information is processed by the DSP circuit 71, it is fed back into the demultiplexer 66 as separate left and right channel digital audio signals 73L,73R.

When the control signal 75 is a logic one, two additional pairs of NAND gates 718,720,722,724 route the digital signals 73L,73R into the noise suppression circuit 70 and subsequent stages, i.e. sixth-order filters 84,86 and emphasis filter stages 88,90. The second pair of NAND gates 722,724 each have one input connected to the control line 72 and control signal 75. One NAND gate 724 is for the right channel and has its other input connected to the right channel digital signal 73R received from the DSP circuit 73. Similarly, the other NAND gate 722 is for the left channel and has its other input connected to the left channel digital signal 73L received from the DSP circuit 73. When the control signal 75 is logic one, the digital signals 73R,73L for the right and left channels pass through to the third pair of NAND gates 718,720. The third pair of NAND gates 718,720 performs a multiplexer type function by routing either the analogue signal 66R,66L or the digital signal 73R,73L depending on the state of the control line, i.e. control signal 75 logic one or logic zero.

In terms of digital signal processing, the DSP unit 73 can process the signal 64 from the tap 718 in a number of known ways. Once the DSP 73 processes the signal 64 in a known manner, the resulting digital signals 73L,73R are fed back into digital/analogue unit 68. For example, the digital signals 73R,73L can be in pulse code modulated format (PCM). The digital audio signals 73R,73L are then processed by the remaining stages of the circuit as was discussed above.

It will be evident to those skilled in the art that other embodiments of the invention fall within its spirit and scope as defined by the following claims.

We claim:

1. An apparatus, for reading an audio signal track, incorporated as an optically encoded variable area track on a tape, said apparatus comprising: a light source for illuminating a soundtrack on the tape from one side thereof; a linear detector array, for location on the other side of the soundtrack and including an integral slit which determines a transverse strip of the image of the soundtrack that is read; and said linear detector array including means for producing an encoded signal in response to the image of the soundtrack.

2. An apparatus as claimed in claim 1, further including lens means for projecting the image of the soundtrack in the plane of the slit and linear detector array, said lens system comprising a lens located on the other side of the soundtrack, between the soundtrack and the linear detector array.

3. An apparatus as claimed in claim 2, wherein the lens is such as to provide an image of the soundtrack at the linear detector array which is enlarged relative to the original soundtrack.

4. An apparatus as claimed in claim 1, further including processing means, coupled to said linear detector array, for processing said encoded signal into an output audio signal, and said processing means including feedback control means for conditioning said encoded signal so that the output audio signal is substantially uniform and independent of the characteristics of the variable area soundtrack.

5. An apparatus as claimed in claim 4, wherein said processing means includes: a summation unit coupled to the linear detector array; an input AC amplifier connected to the output of said summation unit; and a low pass filter connected to the output of said input AC amplifier.

6. An apparatus as claimed in claim 5, wherein said processing means further includes a second summation unit, said second summation unit being connected to the output of said low pass filter; and an amplification unit connected to the output of said second summation unit.

7. An apparatus as claimed in claim 4, wherein said processing means includes baseline control means for providing said encoded signal with a zero average baseline, said second summation unit including a second input for connecting the output of the baseline control means thereby providing said amplification unit with said encoded signal having a zero average baseline.

8. An apparatus as claimed in claim 7, wherein said amplification unit comprises first and second differential amplifiers, said first differential amplifier being coupled to the output of said second summation unit, said second differential amplifier being connected to the output of said first differential amplifier, and the output of said second differential amplifier being coupled to a summation node.

9. An apparatus as claimed in claim 8, wherein said first differential amplifier includes variable gain means for adjusting the gain of the first differential amplifier, said feedback control means being coupled to said variable gain means of the first differential amplifier, and wherein said processing means further includes negative peak detector means for limiting the negative peaks of said encoded signal to predetermined values, and said negative peak detector means being coupled to the output of said second differential amplifier and to said feedback control means.

10. An apparatus as claimed in claim 9, wherein said processing means further includes positive peak detector means for limiting the positive peaks of said encoded signal to predetermined values, and said positive peak detector means being coupled to the output of said second differential amplifier and to said summation node.

11. An apparatus as claimed in claim 10, wherein said feedback control means comprises a gain control unit coupled to said negative peak detector means and to said gain control means of the first differential amplifier.

12. An apparatus as claimed in claim 11, wherein said feedback control comprises: a stablization unit connected to said negative peak detector means; a level shift unit connected to the output of said stabilization unit; and said gain control unit being connected to the output of said level shift stage.

13. An apparatus as claimed in claim 12, wherein said gain control unit comprises a field effect transistor.

14. An apparatus as claimed in claim 4 or 9, wherein said processing means further includes control means for detecting whether an analogue or digital soundtrack is present and producing a decode control output, a digital-analogue control unit connected to said decode control output, said digital-analogue control unit having an input for an analogue soundtrack signal, an input for a digital soundtrack signal, and a signal output, and said digital-analogue control unit switching one of those inputs to said signal output, as controlled by said decode control output.

15. An apparatus as claimed in claim 1, wherein said processing means includes control means for detecting whether an analogue or digital soundtrack is present and producing a decode control output, a digital-analogue control unit connected to said decode control output, said digital-analogue control unit having an input for an analogue soundtrack signal, an input for a digital soundtrack signal, and output, and said digital-analogue control unit switching one of those inputs to the output, as controlled by said decode control output.

16. An apparatus as claimed in claim 15, which includes a beam splitter for splitting the beam transmitted through the soundtrack, so that only part of the beam is received by said linear detector array, and wherein said synchronization control means includes a detector for receiving and detecting the other part of the beam.

17. An apparatus as claimed in claim 16, wherein said synchronization control means includes a phase locked loop having an input coupled to said detector, and outputs for said decode control output and a voltage controlled oscillator, said decode control output being connected to and controlling said digital-analogue control unit.

18. An apparatus as claimed in claim 17, wherein said synchronization control means includes a detector amplifier for amplifying the output of said detector; a band pass limited amplifier connected to the output of said detector amplifier; said phase locked loop connected to the output of said band pass limited amplifier; an inverter connected to an output of said phase locked loop; and a phase detector having an input connected to the output of said band pass limited amplifier, an input connected directly to the output of said phase locked loop and an input coupled to the output of said inverter, which phase detector is coupled to said decode control signal output.

19. An apparatus as claimed in claim 18, wherein said synchronization control means includes an integration amplifier, connected to the output of said phase detector and having an output providing said decode control output; and a phase shifter connected to the output of said phase locked loop and capable of providing a desired phase shift, said phase shifter having a transfer clock output.

20. An apparatus as claimed in claim 19, wherein said linear detector array comprises a CCD array having a clock output and a transfer clock output, and said processing means includes a counter unit having inputs for those two clock outputs and which divides the CCD clock output by N, where 2N is the number of pixels in the CCD array, and said processing means also includes a stereo demultiplexer unit, said stereo demultiplexer unit being connected to said digital-analogue control unit, said stereo demultiplexer unit having separate outputs for left hand and right hand channels, with the output of said counter unit being connected to said stereo demultiplexer unit and switching said encoded signal between the outputs thereof to effect separation of left and right hand channels, and said processing means further includes respective low pass filters for the left hand and right hand channel coupled to the respective outputs of said stereo demultiplexer unit.

21. An apparatus as claimed in claim 15, wherein said linear detector array comprises a CCD array having a clock output and a transfer clock output, and said processing means includes a counter unit having inputs for those two clock outputs and which divides the CCD clock output by N, where 2N is the number of pixels in the CCD array, and said processing means also includes a stereo demultiplexer unit, said stereo demultiplexer unit being connected to said digital-analogue control unit, said stereo demultiplexer unit having separate outputs for left hand and right hand channels, with the output of said counter being connected to said stereo demultiplexer unit and switching said encoded signal between the outputs thereof to effect separation of left and right hand channels, and said processing means further includes respective low pass filters for the left hand and right hand channel coupled to the respective outputs of said stereo demultiplexer unit.

22. An apparatus as claimed in claim 3, wherein said linear detector array comprises a CCD array having separate outputs for odd and even pixels; and a summation unit for summing the outputs of said CCD array.

23. An apparatus as claimed in claim 1, 4, 15 or 20, wherein said light source comprises a high efficiency monochromatic light source.

24. An apparatus as claimed in claim 23, wherein said light source comprises a light emitting diode.

25. An apparatus, for reading a variable area soundtrack, incorporated as an optically encoded variable area track, on a tape, said apparatus comprising: a light source for illuminating one side of the soundtrack; detector means for location on the other side of the soundtrack; said detector means including integral slit means for causing a narrow, transverse strip of the soundtrack to be detected by said detector means, and said detector means producing an encoded signal indicative of the detected transverse strip of the soundtrack; processing means, coupled to said detector means, for processing said encoded signal into an output audio signal; and said processing means including feedback control means for conditioning said encoded signal so that said output audio signal is substantially uniform and independent of the characteristics of said variable area soundtrack.

26. An apparatus as claimed in claim 25, wherein said detector means comprises a linear array with an integral slit in a substantially common plane with said linear array, and said apparatus further including lens means for focusing said narrow transverse strip to form an image of the soundtrack in the plane of said linear array.

27. An apparatus as claimed in claim 26, wherein said linear detector comprises a linear CCD array having separate outputs for odd and even pixels, and wherein said processing means is coupled to the outputs of said CCD array and includes a summation unit connected to said outputs for odd and even pixels.

28. An apparatus as claimed in claim 25, wherein said processing means includes an input AC amplifier connected to the output of said summation unit; and a low pass filter connected to the output of said input AC amplifier.

29. An apparatus as claimed in claim 28, wherein said processing means further includes a second summation unit, said second summation unit being connected to the output of said low pass filter; and an amplification unit connected to the output of said second summation unit.

30. An apparatus as claimed in claim 29, wherein said processing means includes baseline control means for providing said encoded signal with a zero average baseline, said second summation unit including a second input for connecting the output of said baseline control means thereby providing said amplification unit with said encoded signal having a zero average baseline.

31. An apparatus as claimed in claim 30, wherein said amplification unit comprises first and second differential amplifiers, said first differential amplifier being coupled to the output of said second summation unit, said second differential amplifier being connected to the output of said first differential amplifier, and the output of said second differential amplifier being coupled to a summation node.

32. An apparatus as claimed in claim 31, wherein said first differential amplifier includes variable gain means for adjusting the gain of the first differential amplifier, said feedback control means being coupled to said variable gain means of the first differential amplifier, and wherein said processing means further includes negative peak detector means for limiting the negative peaks of said encoded signal to predetermined values, and said negative peak detector means being coupled to the output of said second differential amplifier and to the feedback control means.

33. An apparatus as claimed in claim 32, wherein said processing means further includes positive peak detector means for limiting the positive peaks of said encoded signal to predetermined values, and said positive peak detector means being coupled to the output of said second differential amplifier and to said summation node.

34. An apparatus as claimed in claim 33, wherein said feedback control means comprises a gain control unit coupled to said negative peak detector means and to said gain control means of the first differential amplifier.

35. An apparatus as claimed in claim 34, wherein said feedback control comprises: a stabilization unit connected to said negative peak detector means; a level shift unit connected to the output of said stabilization unit; and said gain control unit being connected to the output of said level shift stage.

36. An apparatus as claimed in claim 35, wherein said gain control means comprises a field effect transistor.

37. An apparatus as claimed in claim 29 or 32, wherein said processing means further includes synchronization control means for detecting whether an analogue or digital soundtrack is present and producing a decode control output, a digital-analogue control unit connected to said decode control output, said digital-analogue control unit having an input for an analogue soundtrack signal and being coupled to the output of said amplification unit, an input for a digital soundtrack signal, and a signal output, and said digital-analogue control unit switching one of those inputs to the signal output, as controlled by said decode control output.

38. An apparatus as claimed in claim 37, which includes a beam splitter for splitting the beam transmitted through the soundtrack, so that only part of the beam is received by said linear detector array, and wherein said synchronization control means includes a detector for receiving and detecting the other part of the beam.

39. An apparatus as claimed in claim 38, wherein said linear detector array comprises a CCD array having a clock output and a transfer clock output, and said processing means includes a counter unit having inputs for those two clock outputs and which divides the CCD clock output by N, where 2N is the number of pixels in the CCD array, and said processing means also includes a stereo demultiplexer unit, said stereo demultiplexer unit being connected to said digital-analogue control unit, said stereo demultiplexer unit having separate outputs for left hand and right hand channels, with the output of said counter unit being connected to said stereo demultiplexer unit and switching said encoded signal between the outputs thereof to effect separation of left and right hand channels, and said processing means further includes respective low pass filters for the left hand and right hand channel coupled to the respective outputs of said stereo demultiplexer unit.

40. An apparatus for reading a variable area soundtrack, incorporated as an optically encoded variable area track, on a tape, said apparatus comprising: a light source for illuminating one side of the soundtrack; detector means for location on the other side of the soundtrack, and having a encoded signal output; processing means connected to said encoded signal output of the detector, and said processing means having a processed signal output; a digital-analogue control unit connected to the output of said processing means and having an analogue input, a digital input, a control input, and an audio signal output; and control means for detecting whether an analogue or digital soundtrack is present and generating a decode control output, said control means being connected to said control input of said digital-analogue control unit.

41. An apparatus as claimed in claim 40, which includes a beam splitter which, in use, is located between the tape and said detector, which beam splitter causes one part of the light beam from the light source transmitted through the tape to pass to said detector, and the other part of that beam to be separated therefrom; a secondary detector for receiving said other part of the beam; and said secondary detector being coupled to said synchronization control means, for detecting presence of a synchronizing signal, said synchronization control means having said decode control output connected to said control input of the digital-analogue control unit, which decode control output indicates the presence of a synchronizing signal and controls said digital-analogue control unit so that said digital input is switched to the audio signal output when the synchronizing signal is detected, and said analogue input, being coupled to said signal output of said processing means, is switched to the audio signal output when the synchronizing signal is not present.

* * * * *